United States Patent
Chivite Zabalza et al.

(10) Patent No.: US 8,787,049 B2
(45) Date of Patent: Jul. 22, 2014

(54) CONTROL METHOD FOR CONVERTING POWER, AND ELECTRONIC POWER CONVERTER ADAPTED TO CARRY OUT SAID METHOD

(75) Inventors: Francisco Javier Chivite Zabalza, Zamudio (ES); Miguel Angel Rodriguez Vidal, Zamudio (ES); Danel Madariaga Zubimendi, Zamudio (ES); Pedro Izurza Moreno, Zamudio (ES); Gorka Calvo Olalla, Zamudio (ES)

(73) Assignee: Ingeteam Power Technology, S.A., Zamudio Bizkaia (ES)

( * ) Notice: Subject to any disclaimer, the term of this patent is extended or adjusted under 35 U.S.C. 154(b) by 153 days.

(21) Appl. No.: 13/291,589

(22) Filed: Nov. 8, 2011

(65) Prior Publication Data
US 2012/0113695 A1 May 10, 2012

(30) Foreign Application Priority Data
Nov. 8, 2010 (ES) .................................. P201031637

(51) Int. Cl.
*H02M 7/48* (2006.01)
*H02M 7/44* (2006.01)

(52) U.S. Cl.
USPC ............................................ 363/71; 363/98

(58) Field of Classification Search
CPC ...................................................... H02M 7/497
USPC .................................. 363/71, 39, 98
See application file for complete search history.

(56) References Cited

U.S. PATENT DOCUMENTS

| | | | | |
|---|---|---|---|---|
| 5,999,428 A | * | 12/1999 | Dahler et al. | 363/71 |
| 7,808,125 B1 | * | 10/2010 | Sachdeva et al. | 307/82 |
| 2001/0038541 A1 | * | 11/2001 | Hammond et al. | 363/40 |
| 2009/0066307 A1 | * | 3/2009 | Osterhout et al. | 323/283 |
| 2012/0147639 A1 | * | 6/2012 | Mao et al. | 363/98 |

* cited by examiner

*Primary Examiner* — Adolf Berhane
*Assistant Examiner* — Emily P Pham
(74) *Attorney, Agent, or Firm* — Sughrue Mion, PLLC

(57) ABSTRACT

A control method and apparatus are provided to convert a DC voltage into alternating voltage. The apparatus includes a first inverter and a second inverter to generate a first alternating voltage and a second alternating voltage, respectively. Also included is an interphase transformer to combine these alternating voltages in parallel to obtain a first resulting alternating voltage. The apparatus also includes a third inverter and a fourth inverter to generate a third and fourth alternating voltage, respectively. These are combined to form a second resulting alternating voltage. The second resulting alternating voltage is displaced in phase approximately 180° in relation to the first resulting alternating voltage.

21 Claims, 3 Drawing Sheets

US 8,787,049 B2

CONTROL METHOD FOR CONVERTING POWER, AND ELECTRONIC POWER CONVERTER ADAPTED TO CARRY OUT SAID METHOD

INCORPORATION BY REFERENCE

This application claims priority from Spanish Patent Application No. P201031637 filed on Nov. 8, 2010 including the specification, drawings and abstract thereof, the disclosure of which is incorporated herein by reference in its entirety.

TECHNICAL FIELD

Aspects of the invention relate to control methods in high-power environments, and in particular to control methods for converting energy for transmission and/or distribution lines from a DC voltage. Aspects of the invention also relate to electronic power converters adapted to carry out said control methods.

BACKGROUND OF THE INVENTION

Electronic power converters are currently used in a wide range of applications where a DC/AC conversion is required, carried out by means of inverters comprised by said converters, such as variable-speed drives, variable-speed wind turbines, solar inverters, UPS (Uninterruptible Power Supplies) systems or FACTS (Flexible AC Transmission Systems) devices.

Inverters in electronic power converters comprise static semiconductor-type switches. The switching characteristics of the semiconductor devices currently available on the market enable the most suitable semiconductor for each type of application to be chosen. As a result, depending on the power level required or demanded, different families of semiconductors may be identified:

MOSFETs: These are FET-technology semiconductors, ideal for low power/voltage and high-frequency-switching applications, such as switched sources and photovoltaic inverters. They are the most widely used in mass-produced consumer appliances.

IGBTs and IEGTs: Transistor-technology semiconductors. The IGBT has become the standard in low- and mid-power applications and in multi-MW applications with multi-level topologies. Mitsubishi has recently developed the IEGT with encapsulated press-pack for mid-voltage and high-power applications, as a result of which three-phase inverters of up to 10 MVAs can now be made. These are used in industrial drives, electric rail traction and equipment for renewable-energy generators (solar and wind), for example.

GTOs and IGCTs: Thyristor-technology semiconductors, provided with drivers that enable them to operate with forced switching. As with IEGTs, converters with power units of approximately 10MW can be developed, although the switching frequency is limited to frequencies in the region of 200 Hz for GTOs and 1000 Hz for IGCTs. They may be applied, for example, in high-power drives, FACTS devices, which may typically be SSSC (Static Series Synchronous Compensator) if connected in series with a transmission and/or distribution line, or STATCOM if connected in parallel with a transmission and/or distribution line, or UPFC (Universal Power Flow Controller), this being a combination of SSSC and STATCOM.

The output voltage of the converter can be increased by increasing the number of levels of its output voltage, thereby increasing the power of the converter, which is achieved by using multi-level inverters. In addition, the quality of the waveform of the output voltage increases with the number of levels. As a result, with a three-level inverter, for example, it is possible to obtain a five-level output voltage waveform. The greater the number of levels, the greater the complexity in implementing the converter (of the inverters), as a result of which, and generally speaking, industrial applications are usually based on inverters or branches of up to two or three levels at most.

The most commonly used solution in the manufacture of high-power converters for FACTS applications, for example, is the connection of three-phase inverters of two or three levels to each other by means of intermediate magnetic elements or transformers, so that thanks to said connection or combination, another increase in the output voltage, and, therefore, in the power of the converter, is achieved, also improving the quality of the output waveform. For example, U.S. Pat. No. 3,628,123 A discloses the combination in parallel of two inverters by means of interphase transformers or IPTs.

U.S. Pat. No. 5,889,668 A discloses an electronic power converter. In said converter, a DC voltage is converted into an alternating voltage obtaining different alternating voltage waves by means of different inverters, a plurality of alternating output voltage waves being obtained. Said alternating output voltage waves are combined in parallel in twos, by means of interphase transformers or IPTs, until two resulting alternating voltage waves are obtained and which are handled for the elimination of at least some of their harmonics. The two resulting alternating voltage waves then reach two secondary windings of a coupling transformer by means of which the electronic power converter is coupled to the transmission and/or distribution line. To reduce the harmonic content of the voltage in the primary of the coupling transformer, the windings of one secondary are connected in wye and the windings of the other secondary in delta.

SUMMARY OF THE INVENTION

It is an aspect of the invention to provide a method for converting a DC voltage into an alternating voltage for transmission and/or distribution lines, and a converter adapted to carry out said method, in order that the power supplied to the transmission and/or distribution lines comprises a high voltage value while also presenting optimal waveform quality.

According to one aspect, a DC voltage is converted into alternating voltage for obtaining at least one first alternating voltage waveform by means of at least one inverter and a second alternating voltage waveform by means of at least one other inverter, and the alternating output voltage waves of both inverters are combined in parallel, a high-power resulting alternating voltage waveform thus being obtained.

In addition, an additional resulting alternating voltage waveform is also generated, a third alternating voltage waveform by means of at least one additional inverter and a fourth alternating voltage waveform by means of at least one other inverter being obtained during the conversion, and the alternating output voltage waves of said additional inverters are combined in parallel.

The additional resulting alternating voltage waveform is phase-shifted by approximately 180° in relation to the resulting alternating voltage waveform, so that thanks to the control method of the invention two voltage signals are generated and which are adapted to correspond with two output signals of the converter (voltage waves in two terminals of said converter), said terminals being used to couple the converter to a load (preferably the load corresponds with a transmission and/or distribution line). As a result, as the voltage waves of the two terminals that are used to couple the converter to a load are substantially in opposition, the voltage of the output voltage waveform of said converter is also practically doubled, thereby providing a high-power converter in a simple and economic manner, without the need for additional elements that would make said converter more expensive.

As a result of this control method, two voltage waves are obtained and are adapted to be supplied through two terminals of the converter, enabling a converter with two open poles on the output to be coupled to a load (preferably the load corresponds with a transmission and/or distribution line), generally by means of a specific magnetic component. Thanks to the arrangement of converter used by the control method, said magnetic component can comprise a coupling transformer with a single coil on the secondary, where the two terminals of the converter are connected, so that an electronic power converter with less magnetic components than those previously necessary is obtained. This results in a more economical converter, and also a reduction in the associated high-voltage switchgear which was previously necessary and which would involve a very high cost. This implies a reduction in the size of the magnetic components that are used, which results in a smaller size of the converter, which can be advantageous in some situations.

According to these aspects, the common-mode voltages may also be eliminated in an ordinary manner from at least one of the alternating voltage waves, as a result of which the quality of the voltage waveform applied in the load is optimal, the low number of inverters being used, which implies a reduction in the cost and the size of the resulting converter in relation to those used in the prior art. This also allows the use of modulation techniques that produce a zero-sequence voltage component, for the purposes of increasing the voltage of the output voltage waveform and the power supplied by the converter, in a simple manner.

These and other advantages and characteristics of the invention will be made evident in the light of the drawings and the detailed description thereof.

DETAILED DISCLOSURE OF THE EMBODIMENTS

The control method of the invention is adapted for its use in electronic power converters C, in particular of the VSC (Voltage Source Converter) type, which convert DC voltage into alternating voltage preferably for transmission and/or distribution lines. Although it is a three-phase system, the Figures and the description show and explain the invention in a single-wire manner for the purposes of clarity.

Figure 1:
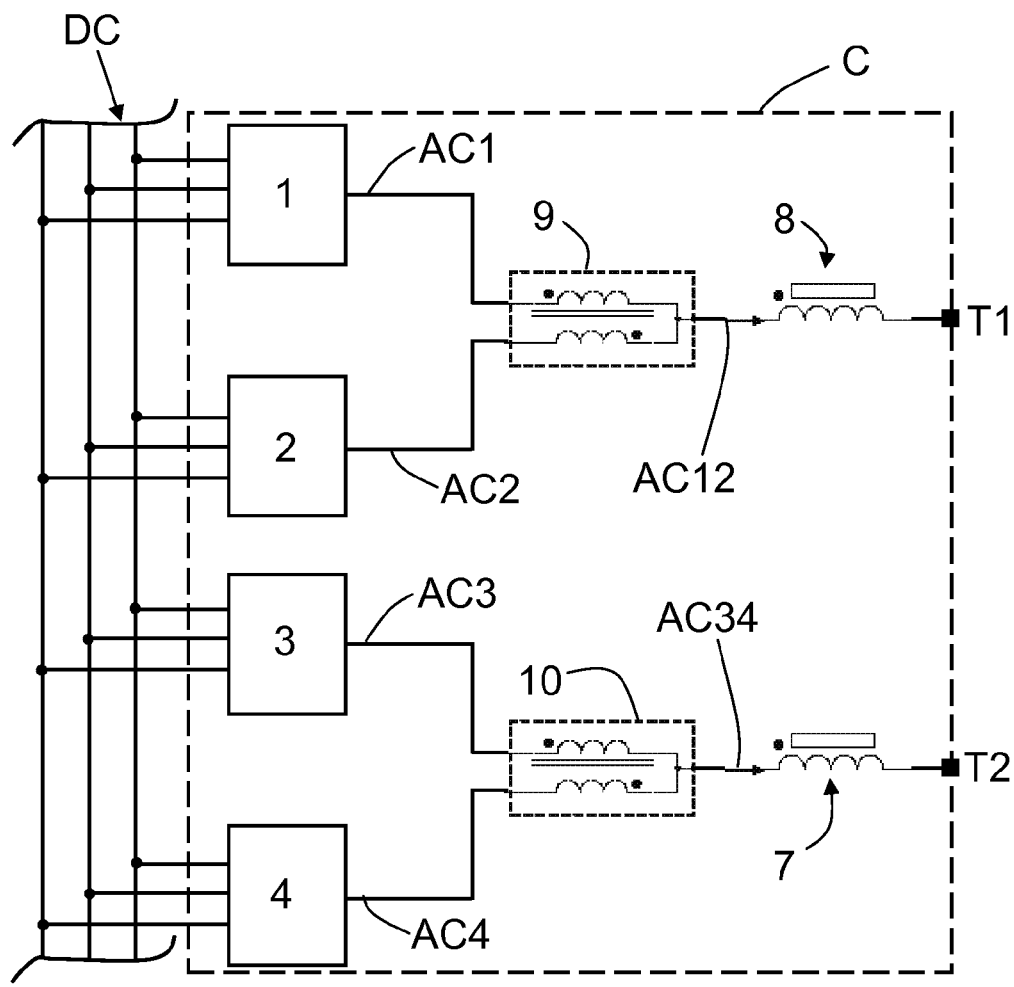
FIG. 1 schematically shows an embodiment of an electronic power converter.
Figure 2:
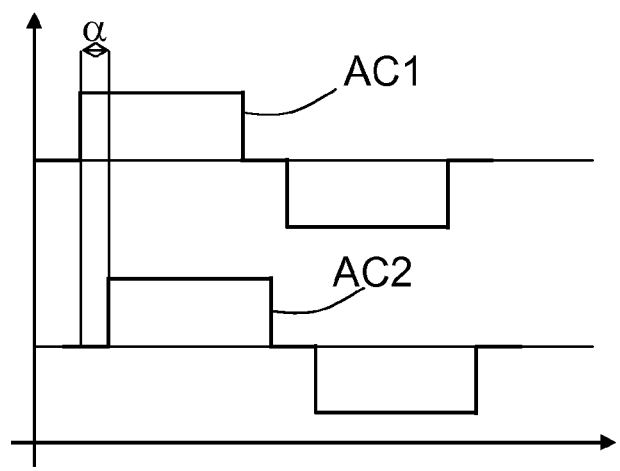
FIG. 2 shows the alternating output voltages of two inverters of the converter of FIG. 1, which are combined in parallel with each other.

FIG. 1, in the form of blocks, shows an embodiment of an electronic power converter C adapted to support the method of the invention. Said converter C comprises at least one first three-phase inverter 1 that is fed by DC voltage from a DC power supply, and at least one second three-phase inverter 2 that is also fed by said DC voltage, the DC voltage being converted into a first alternating voltage waveform AC1 by means of the first inverter 1, and a second alternating voltage waveform AC2 by means of the second inverter 2 being obtained. The converter C also comprises combination means 9 that preferably correspond with an interphase transformer or IPT (interphase transformer), to combine in parallel said alternating voltage waves AC1 and AC2 with each other so that a resulting alternating voltage waveform AC12 is obtained. Also, as shown in FIG. 2, said alternating voltage waves AC1 and AC2 of the inverters 1 and 2 are displaced in phase by a small angle α in relation to each other so that, by slightly sacrificing the amplitude of the resulting alternating output voltage waveform AC12, certain harmonics of said alternating voltage waveform AC12 are eliminated or reduced. The angle α can be approximately 7.5°, for example, an angle at which the harmonics close to twenty-four in the resulting waveform are eliminated or reduced. That is, harmonics twenty-three and twenty-five are reduced to such an extent they can be considered eliminated, with an insignificant reduction of the amplitude of the resulting alternating output voltage waveform AC12.

Figure 3A:
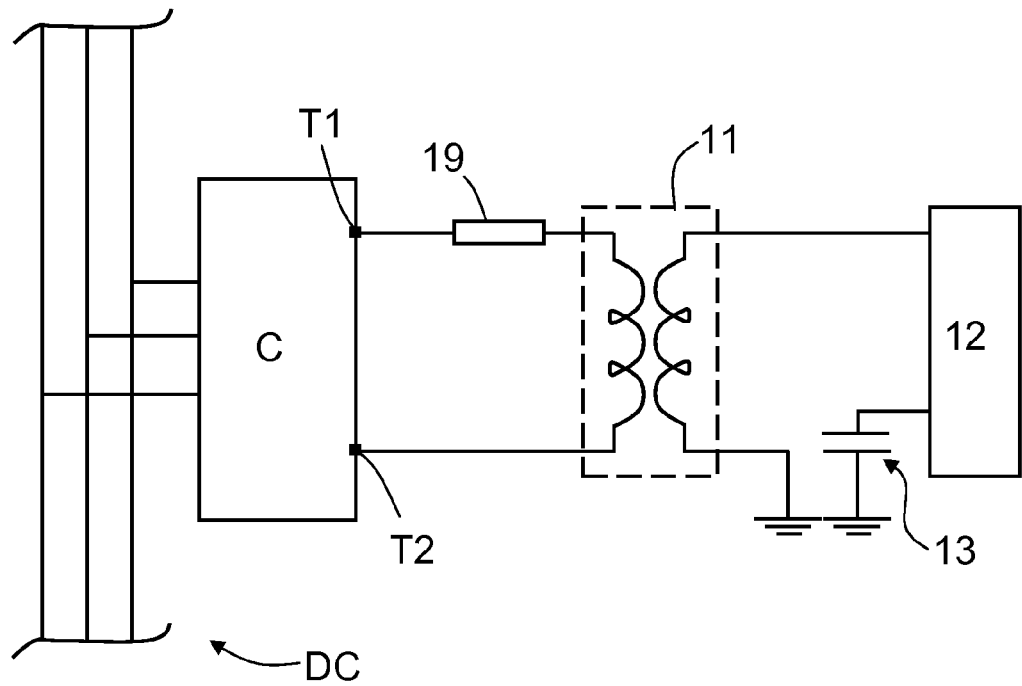
FIG. 3a schematically shows a converter according to FIG. 1, coupled to a load in parallel by means of a magnetic component.
Figure 3B:
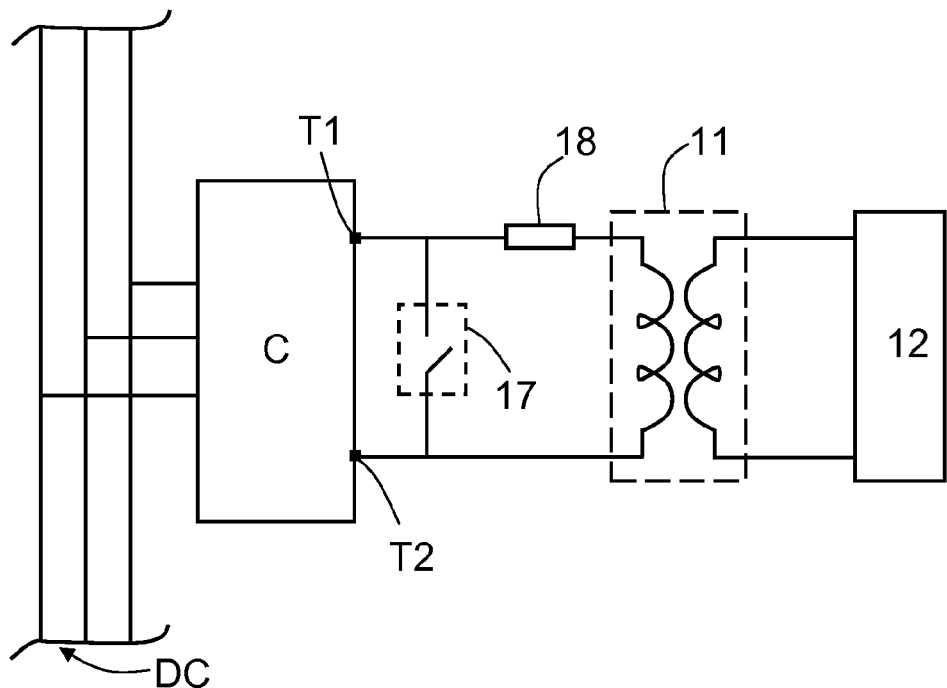
FIG. 3b schematically shows a converter according to FIG. 1, coupled to a load in series by means of a magnetic component.

In order to carry out this method, the converter C also comprises at least one third inverter 3 and one fourth inverter 4 fed by the DC voltage, a first additional alternating voltage waveform AC3 and a second additional alternating voltage waveform AC4 being obtained respectively as a result of the conversion. The converter C comprises additional combination means 10, which preferably correspond with an interphase transformer or IPT, to combine in parallel said additional alternating voltage waves AC3 and AC4 with each other, with a resulting additional alternating voltage AC34 being obtained. Both resulting alternating voltage waves AC12 and AC34 are supplied to the output of the converter C by means of two terminals T1 and T2 of the converter C. This enables a converter C with two poles or terminals T1 and T2, open at the output, to be coupled to a load 12 (preferably the load corresponds with a transmission and/or distribution line), by means of a specific magnetic component 11 as shown in the embodiment of FIG. 3a, referring to a parallel coupling to the load 12, and in the embodiment of FIG. 3b, referring to a series coupling to the load 12. The magnetic component 11 comprises a three-phase coupling transformer with a single coil in the secondary, where the two terminals T1 and T2 of the converter C are connected so that the coupling in series to the load 12 is made easier and an electronic power converter C with less magnetic components than those necessary in the prior art is obtained. This provides a more economical converter. The coupling transformer can also comprise an auxiliary delta winding that provides a low-impedance path for the zero-sequence currents. As a result, the zero-sequence currents that flow along the line do not flow through the converter and vice versa. Additionally, this involves a reduction of the size of the magnetic components that are used, which involves a smaller size of the unit formed by the converter C and the accompanying magnetic components. In the parallel coupling, a capacitor bank 13 is generally used to increase the capacitive power, and an additional reactance 19 is used to increase the inductive power of the equipment and reduce short-circuit intensity through a secondary of the coupling transformer. On the other hand, in the series coupling, an additional reactance 18 is generally used to increase the inductive power of the equipment and reduce short-circuit intensity through a secondary of the coupling transformer, and a by-pass 17 to close it in the event of a fault in the load.

In the embodiment of FIG. 1, and throughout the description, mention is made of the use of four inverters 1, 2, 3 and 4, although as many inverters as are needed can be used. Accordingly, the invention is not limited to the use of four inverters. In the event of more inverters being used, the inverters are combined in parallel with each other until they produce two alternating output voltage waves, which correspond with the alternating voltage waves AC12 and AC34 of FIG. 1.

Figure 4:
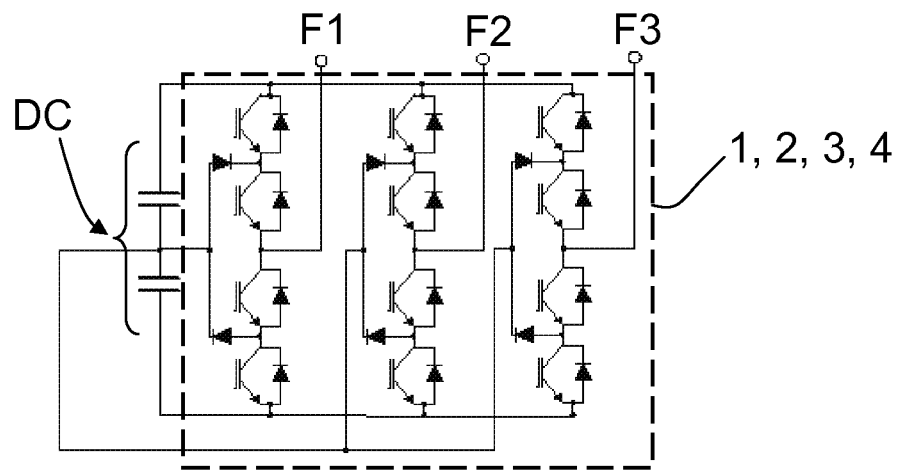
FIG. 4 shows a multi-level inverter of the converter of FIG. 1.

The additional resulting alternating voltage waveform AC34 is displaced in phase approximately 180° in relation to the resulting alternating voltage waveform AC12, so that the output voltage waveform of the converter C is also increased when it is coupled to the load 12. The inverters 1, 2, 3 and 4 used are multi-level inverters, preferably of three levels such as the one shown in FIG. 4 (hence the alternating voltage waves AC1 and AC2 shown in FIG. 2), which enables the output power of the converter C to be increased. As noted, the system is three-phase, as a result of which the inverters used are also three-phase and generate three output phases F1, F2 and F3 (the alternating voltage waves AC1, AC2, AC3 and AC4 correspond with one of said phases F1, F2 or F3, for which reason, as noted above, only one phase is detailed in a single-wire manner for purposes of clarity).

As a result of this method, the common-mode voltages of at least one of the alternating voltage waves AC1, AC2, AC3, AC4, AC12 or AC34 are also eliminated, which involves a reduction in the harmonic content of the output voltage waveform of the converter C. Therefore the quality of the voltage and/or power supplied to the load 12 is optimal. For this purpose the converter C comprises filter means 7, 8, which preferably correspond with a zero-sequence blocking transformer or ZSBT. Preferably, said common-mode voltages are eliminated once the resulting alternating voltage waves AC12 and AC34 have been obtained, a single ZSBT thus being used for each terminal T1 and T2 of the converter C as shown in the embodiment of FIG. 1. It is noted that ZSBTs can also be eliminated in the step prior to obtaining the resulting alternating voltage waves AC12 and AC34, before the alternating voltage waves AC1 and AC2; AC3 and AC4 are combined with each other, as a result of which the voltages are eliminated directly from the alternating voltage waves AC1 and AC2; and AC3 and AC4; a ZSBT being used for each of them. Only one ZSBT may be used for one of the resulting voltage waves AC12 or AC34 of one of said terminals T1 or T2, and none used in the other terminal T2 or T1. Instead of one of these alternative proposals, a combination of these proposals can be adopted, provided that they are used to eliminate the common-mode voltages. As a result, and in addition, as a result of the method described above, less inverters 1, 2, 3 and 4 are required and a reduction in the cost and size of the resulting converter C is obtained.

Figure 5:
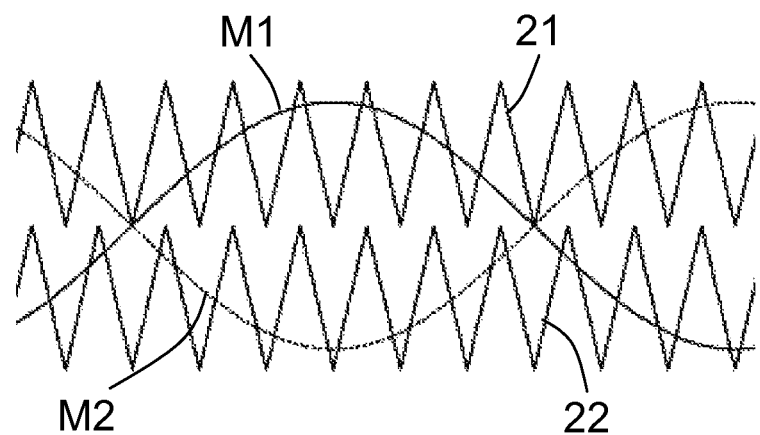
FIG. 5 shows waves used in a PWM-modulation embodiment, in an embodiment of the method of the invention implemented in the converter of FIG. 1.

To reduce the harmonic content of the output voltage to be supplied to the load 12, according to the first embodiment, PWM modulation (Pulse Width Modulation) type techniques are used, in which the shape of the output waveform is obtained by comparing an modulated output waveform (for instance at a frequency of 50 Hz) with a high-frequency triangular waveform (for instance 600-10,000 Hz) to obtain an output voltage waveform of low harmonic content. This PWM modulation may be carried out by using the respective modulating waves M1 and M2 displaced in phase in relation to each other in both inverters 1 and 2; 3 and 4 whose alternating output voltage waves AC1 and AC2; AC3 and AC4 are combined in parallel, and the triangular waves 21 and 22 that are equal and in phase, as shown in FIG. 5, or with the modulating waves M1 and M2 in phase and the triangular waves 21 and 22 equal but displaced in phase in relation to each other, preferably by approximately 90°. A combination of the two can also be adopted, in other words, displaced in phase carrier and modulating waves. Similar output voltage waves can be obtained by alternative means, for example, by using vectorial modulation techniques of the SVPWM (Space Vector Pulse-Width Modulation) type. This arrangement also enables the injection of zero-sequence harmonics, for example, the third, to increase the output voltage, as it is blocked by the ZSBT(s).

To reduce the harmonic content of the output voltage, according to a second embodiment, selective harmonic elimination or SHE modulation techniques are used, and by means of which the phase displacements of the switching signals to the semiconductors of the different inverters 1, 2, 3 and 4 are controlled, the two fundamental waves of the different inverters 1 and 2; 3 and 4 whose alternating output voltage waves AC1 and AC2; AC3 and AC4 are combined in parallel being in phase or otherwise. As a result, certain harmonics of the alternating voltage waves AC1, AC2, AC3 and AC4 are eliminated or reduced, which results in a reduction of the harmonic content of said alternating voltage waves AC1, AC2, AC3 and AC4.

The invention claimed is:

1. A control method for converting power, the method comprising:
    converting a DC voltage into a first alternating voltage waveform using a first multi-level inverter;
    converting the DC voltage into a second alternating voltage waveform using a second multi-level inverter;
    combining the first alternative voltage waveform and the second alternating voltage waveform in parallel to obtain a first resulting alternating voltage waveform;
    converting the DC voltage into a third alternating voltage waveform using a third multi-level inverter;
    converting the DC voltage into a fourth alternating voltage waveform using a fourth multi-level inverter;
    combining the third alternative voltage waveform and the fourth alternating voltage waveform in parallel to obtain a second resulting alternating voltage waveform,
    wherein the second resulting alternating voltage waveform (AC34) is displaced in phase by approximately 180° in relation to the first resulting alternating voltage waveform and the common-mode voltages are eliminated from at least one of the alternating voltage waveforms or resulting alternating voltage waveforms.

2. The method according to claim 1, wherein the first, second, third and fourth alternating voltage waveforms that are combined in parallel with each other to obtain the corresponding first and second resulting alternating voltage waveforms comprise different instantaneous values.

3. The method according to claim 2, wherein in order to convert a DC voltage into an alternating voltage for obtaining the alternating voltage waveforms, the multi-level inverters use a PWM modulation with modulating signals in the multi-level inverters displaced in phase in respect to each other, and triangular carrier signals that are in phase.

4. The method according to claim 2, wherein in order to convert the DC voltage into the alternating voltage for obtaining the alternating voltage waveforms, the multi-level inverters use a PWM modulation with modulating signals in the multi-level inverters in phase, and triangular carrier signals that are equal but displaced in phase in relation to each other.

5. The method according to claim 2, wherein in order to convert the DC voltage into the alternating voltage for obtaining the alternating voltage waveforms, the multi-level inverters use a PWM modulation with modulating signals in the multi-level inverters displaced in phase a certain angle in relation to each other, and triangular carrier signals that are equal but displaced in phase in relation to each other.

6. The method according to claim 2, wherein in order to convert the DC voltage into the alternating voltage for obtaining the first and second alternating voltage waveforms a selective harmonic elimination or mitigation modulation is used.

7. The method according to claim 2, wherein the common-mode voltages are eliminated from at least one of the first and second alternating voltage waveforms and the first resulting waveform; and/or one of the third and fourth alternating voltage waveforms or the second resulting alternating waveform.

8. The method according to claim 2, wherein the common-mode voltages are eliminated from the alternating voltage waveforms once said alternating voltage waveforms have been combined.

9. The method according to claim 2, wherein the common-mode voltages are eliminated from the alternating voltage waveforms once said alternating voltage waveforms have been combined.

10. The method according to claim 1, wherein the common-mode voltages are eliminated from at least one of the first and second alternating voltage waveforms and the first resulting waveform; and/or one of the third and fourth alternating voltage waveforms or the second resulting alternating waveform.

11. The method according to claim 1, wherein the common-mode voltages are eliminated from the alternating voltage waveforms once said alternating voltage waveforms have been combined.

12. The method according to claim 1, wherein the common-mode voltage is eliminated from each alternating voltage waveform, said alternating voltage waves subsequently being combined with each other.

13. An electronic power converter, comprising
a block of inverters that comprises at least two multi-level inverters to convert a DC voltage into an alternating voltage to obtain at least two alternating voltage waveforms;
a combining unit that combines in parallel both alternating voltage waves to obtain a first resulting alternating voltage waveform;
a second block of inverters that comprises at least two additional multi-level inverters to convert the DC voltage into an alternating voltage to obtain at least two second alternating voltage waveforms;
a second combining unit to combine in parallel both of the second alternating voltage waveforms to obtain a second resulting alternating voltage waveform displaced in phase by approximately 180° with the first resulting alternating voltage waveform; and
a filter to eliminate the common-mode voltages from the alternating voltage waveforms and the resulting alternating voltage waveforms.

14. The converter according to claim 13, wherein each combining unit comprises an interphase transformer.

15. The converter according to claim 13, wherein the filter comprises a zero-sequence blocking transformer.

16. The converter according to claim 13, wherein the filter eliminates the common-mode voltages from each alternating voltage waveform.

17. The converter according to claim 13, wherein the inverters are three-level inverters.

18. The converter according to claim 13, further comprising a second filter to eliminate the common-mode voltages from the first resulting alternating voltage waveform, and third filter to eliminate the common-mode voltages from the second resulting alternating voltage waveform.

19. The converter according to claim 18, wherein the inverters are three-level inverters.

20. The converter according to claim 18, wherein each combining unit comprises an interphase transformer.

21. The converter according to claim 18, wherein the filter comprises a zero-sequence blocking transformer.

* * * * *